United States Patent [19]

Thaddey

[11] 3,787,701

[45] Jan. 22, 1974

[54] METHOD OF AND APPARATUS FOR DETECTING THE IMAGE FIELDS CONTAINED ON A STRIP OF FILM

[75] Inventor: Kurt Thaddey, Buchs/ZH, Switzerland

[73] Assignee: Ciba-Geigy AG, Basel, Switzerland

[22] Filed: July 8, 1971

[21] Appl. No.: 160,609

[30] Foreign Application Priority Data

July 9, 1970 Switzerland....................... 10380/70
June 18, 1970 Switzerland......................... 7827/70

[52] U.S. Cl. ............... 250/561, 83/50, 340/347 AD
[51] Int. Cl. ............................................. B26d 5/34
[58] Field of Search....... 250/219 FR, 219 QA, 209; 356/201-203; 83/50, 14, 371; 340/347 AD

[56] References Cited

UNITED STATES PATENTS

| | | | |
|---|---|---|---|
| 3,449,586 | 6/1969 | Serra | 250/219 FR |
| 3,469,480 | 9/1969 | Nassenstein et al. | 83/50 |
| 3,541,339 | 11/1970 | St. John et al. | 250/219 D |
| 3,584,224 | 6/1971 | Harlem | 250/219 Q |
| 3,600,997 | 8/1971 | Schmidt | 83/364 |
| 3,598,978 | 8/1971 | Rempert | 250/219 DR |

*Primary Examiner*—Walter Stolwein
*Attorney, Agent, or Firm*—Pierce, Scheffler & Parker

[57] ABSTRACT

A film strip is moved lengthwise from a position at which the light transmission of the strip is measured to a punching station at which a predetermined type of mark or notch is formed in the film. The light transmission is measured by passing a beam of light through the film onto a number of photocells coupled to electronic circuits which binary code the signals from the cells. Those signals which exceed a predetermined first threshold value are allocated one binary signal and the simultaneous occurrence of such binary signals is taken to indicate the beginning or end of an image frame on the strip, the indication being subsequently utilised to activate the punching station.

22 Claims, 5 Drawing Figures

PATENTED JAN 22 1974 3,787,701

SHEET 2 OF 5

METHOD OF AND APPARATUS FOR DETECTING THE IMAGE FIELDS CONTAINED ON A STRIP OF FILM

BACKGROUND OF THE INVENTION

This invention relates to a method and apparatus for detecting the image fields contained on a strip of film by continuous scanning of the film in the direction of its length. In one known method for detecting image fields, the film is scanned by means of a single photoelectric cell disposed behind a slit diaphragm. An electronic system coupled to the cell is used to differentiate the frame lines from the actual image itself. The electronic system functions to detect an abrupt change in the density of the film at the frame lines but when the image is grossly underexposed then the system can fail to detect the frame line and so marking of the film will be effected. On the other hand an abrupt change in density within an image field can result in the electronic system causing unwanted marking of the film.

SUMMARY OF THE INVENTION

This invention seeks to obviate these disadvantages by scanning the film with a plurality of measuring cells which are disposed in a row extending perpendicularly to the longitudinal direction of the film. The signal from each measuring cell is binary coded, the signal which exceeds a predetermined first threshold $S_1$ being allocated the one binary symbol ("1") and those not exceeding that threshold being allocated the other binary symbol ("0"). The possible beginnings of the images or their ends are defined as those positions where a predetermined minimum number of one or the other binary symbol occurs simultaneously, a signal BA in pulse form being produced for each of these possible image starts and a signal BE, likewise in pulse form, for each of these possible image ends.

The invention relates further to an apparatus for carrying out this method. This apparatus comprises means for the stepwise transport of a strip of film, a photoelectric scanner, and means for evaluating the signals supplied by said scanner, and is characterised in that the scanner is equipped with a plurality of measuring cells disposed in a row extending perpendicularly to the direction of film transport, and that each measuring cell output is connected to an analogue-to-digital converter with a binary output, and depending on whether the measuring cell signal does or does not exceed a determined threshold said converter produces a signal "1" or "0" representing one or the other binary symbol.

GENERAL DESCRIPTION OF THE PREFERRED EMBODIMENT

Figure 1:
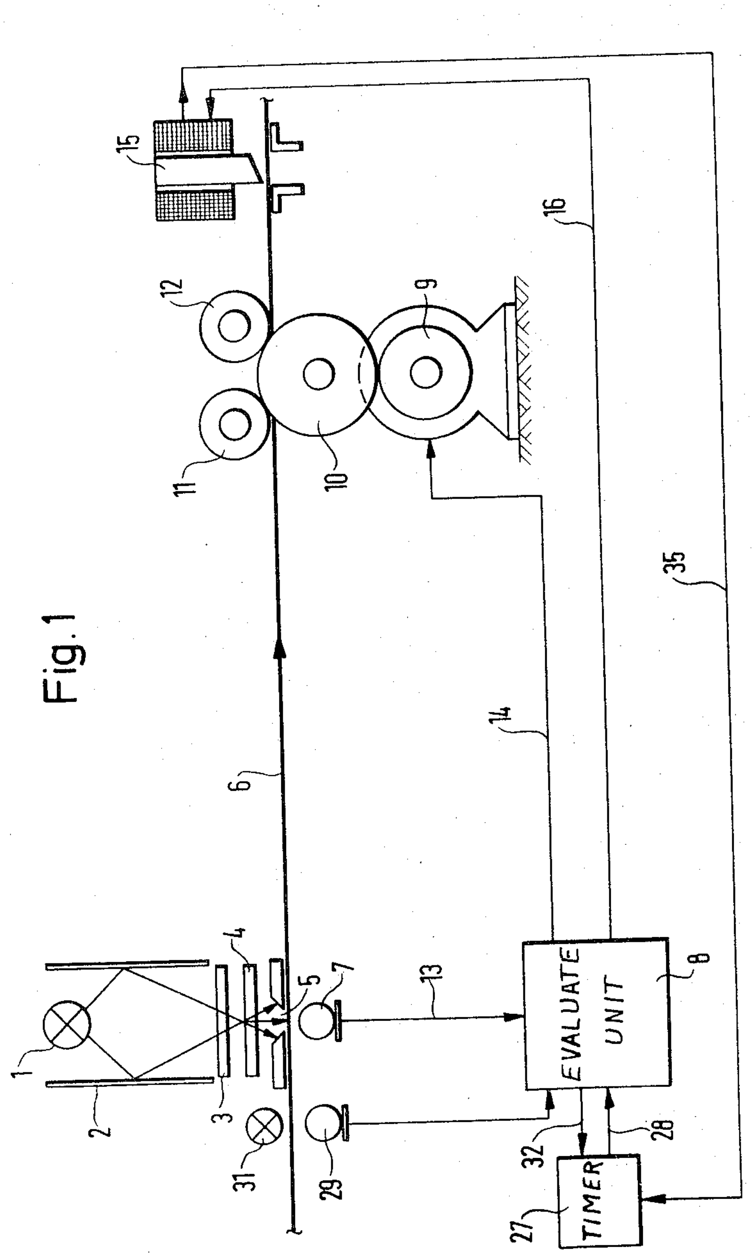
FIG. 1 is a general diagrammatic illustration of apparatus in accordance with this invention.

As shown in FIG. 1, a strip of film 6 is moved by a drive roller 10, driven by a stepping motor 9, and two pressure rollers 11 and 12 past two scanning devices. One scanning device comprises a lamp 1, a mirror hood 2, a heat filter 3, a diffusing screen 4, a slit diaphragm 5, and a plurality of photoelectric measuring cells 7 disposed in a row lying perpendicularly to the plane of the drawing. The measuring cells 7, of which only the one situated at the front is visible in FIG. 1, are preferably phototransistors. The mirror hood 2 serves to reflect light from the source 1 onto the filter 3 which absorbs infrared light. The diffusing screen 4 ensures homogeneous illumination of the slit diaphragm 5. Each of the measuring cells 7 continuously scans the light transmission of the film which is transported in steps of 0.5mm. The outputs of the various measuring cells 7 are each connected by a cable 13 to various inputs of an evaluating electronic system 8. The other scanning device comprises an infrared light source 31 and a measuring cell 29 sensitive to infrared which is likewise connected to the evaluating electronic system 8 and serves to detect splices.

The evaluating electronic system 8 is connected by two lines 32 and 28 to a timer 27 and controls the stepping motor 9 through a line 14 and a marking device 15 through a line 16. In the drawings this marking device is shown as a punch. Undr the control of the evaluating electronic system 8 the punch makes a positioning hole or notch on the edge of the film 6. A line 35 leads back from the marking device 15 to the timer 27 and a signal on this line 35 serves to confirm that marking operations have been effected.

Simultaneously with each punching command issued through the line 16 the evaluating electronic system 8 stops the timer by means of a signal on the line 32 and the stepping motor is also stopped by a signal applied to line 14. On each occasion this state is maintained until the timer receives confirmation that the punching operation has actually been carried out by a signal on line 35. This cycle is repeated for each punching command. If the confirmation is not received, the apparatus will not restart. Each timing pulse effects the advance of the film by 0.5mm.

Figure 2:
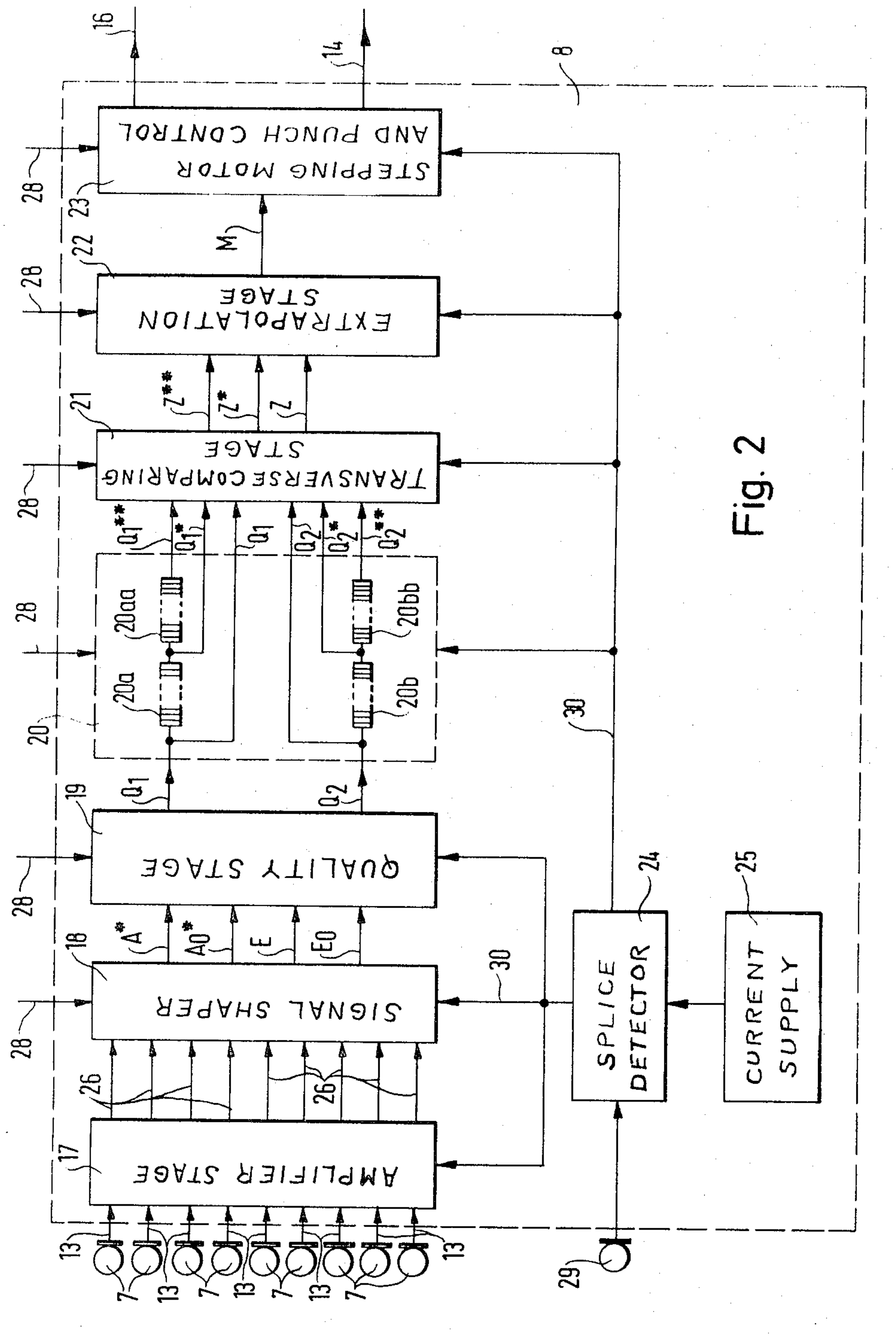
FIG. 2 is a block diagram of the electronic system of the apparatus illustrated in FIG. 1, and FIGS. 3 to 5 are diagrams serving to explain the functioning of the apparatus shown in FIGS. 1 and 2.

As illustrated in FIG. 2 the evaluating electronic system 8 comprises an amplifier stage 17, a signal shaper 18, a quality stage 19, a signal grouping stage 20, a transverse comparison stage 21, an extrapolation stage 22, a stepping motor and punch control system 23, a splice detector 24, and a current supply stage 25. The timing system of stages 18 to 23 is connected by the line 28 to the timer 27 (FIG. 1). The functioning of this arrangement will be explained below with the aid of the block diagram shown in FIG. 2 and of the diagrams in FIGS. 3 to 5. In the present specification operations will be referred to as simultaneous when they lie within a time interval of one timing period.

AMPLIFIER STAGE

In the amplifier stage 17 the signals produced in the measuring cells 7 during the stepwise scanning of the film are reduced by the so-called fog level. At the beginning of each film each measuring cell 7 measures the film fog level in its path. This value of fog level is stored in stage 17 for each measuring cell. As soon as a signal appears the value of which differs from the stored fog value, it is reduced by that fog value and the resulting differential signal is amplified. The amplification factor can be separately adjusted for each of the signals from the various measuring cells 7. The amplified signals are each fed by a line 26 to the signal shaper 18.

SIGNAL SHAPER

In the signal shaper 18 the analogue signals arriving on the lines 26 are converted into digital signals by known means, for example by Schmitt triggers. A signal on one of the lines 26 to a Schmitt trigger produces a logic "1" whilst no signal produces a logic "0." The outputs of all the Schmitt triggers are fed to the input of an adder which adds up the output signals of all the Schmitt triggers. At the output of the adder there is thus produced a signal which has a staircase shape in dependence on the length of the film scanned. This staircase signal is smoothed before further evaluation. In line I in FIG. 3 the timing pulses arriving through the line 28 are shown. The timing periods following the timing pulses are marked by the same reference numerals. The smoothed staircase signal over the length of an image field is shown in line Tr in FIG. 3. The smoothed staircase signal Tr is compared with a first threshold $S_1$. The value of $S_1$ is selected so that whenever a signal "1" is formed at the output of only a single Schmitt trigger the smoothed staircase signal Tr exceeds the threshold. As soon and as long as the smoothed staircase signal Tr exceeds the first threshold $S_1$, an "image" signal B is produced. If the condition for the production of the signal B is not fulfilled, that is to say if the smoothed staircase signal Tr does not exceed the first threshold $S_1$, a "no image" signal $\bar{B}$ is formed. The smoothed staircase signal Tr is simultaneously compared with a second threshold $S_2$. The value of $S_2$ is adjustable and is selected so that $S_2$ is exceeded by the smoothed staircase signal Tr whenever a signal "1" exists simultaneously at the output of *k* Schmitt triggers. For example in the case of nine measuring cells 7, so that there are also nine Schmitt triggers, the number *k* is selected to be equal to any number from 2 to 6, preferably 3. As soon as the smoothed staircase signal Tr exceeds the second threshold $S_2$, an "image interior" signal C is formed on the next timing pulse and remains until the smoothed staircase signal Tr once again falls below the threshold $S_2$. When this is the case (timing period$I_{70}$) on the next timing pulse the formation of the signal C is stopped. The smoothed staircase signal Tr is differentiated and compared with a third threshold $S_3$ which is selected so that it is exceeded by the differentiated staircase signal $dTr/dt$ when and only when the amount of the variation of the non-differentiated staircase signal(Tr) during a timing period is at least equal to the amount of the second threshold $S_2$. Whenever the third threshold $S_3$ is exceeded by the differentiated staircase signal $dTr/dt$ an "image start" pulse signal BA is formed. Finally the differentiated staircase signal $dTr/dt$ is compared with a fourth threshold $S_4$ which is selected so that it is equal in amount to the threshold $S_3$ but has a negative sign. Whenever the differentiated staircase signal $dTr/dt$ falls below the fourth threshold $S_4$ an "image end" pulse signal BE is produced.

Figure 3:
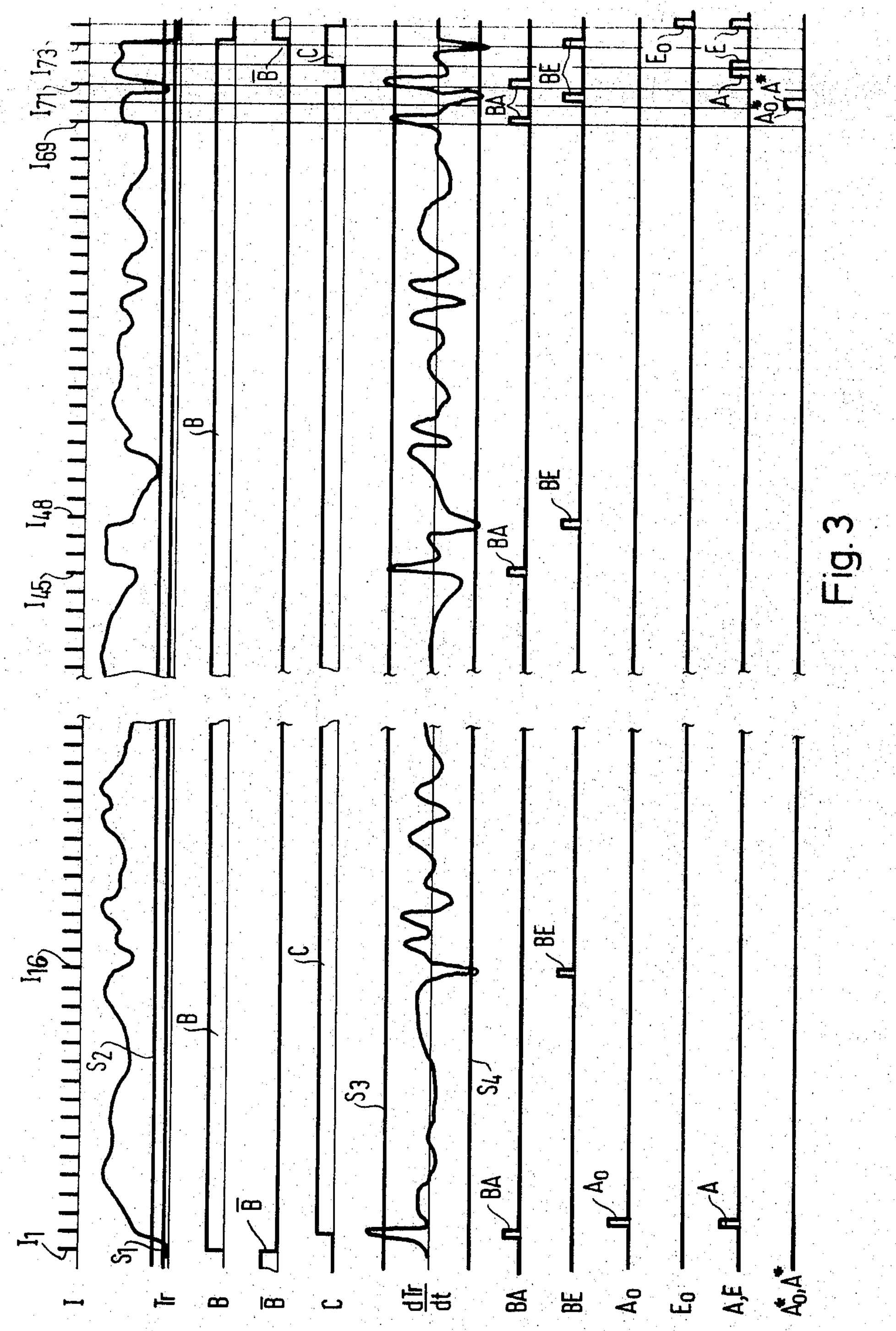

As can be seen from FIG. 3, despite the above conditions stipulated for the production of the signals BA and BE, it may happen that one or more of these signals is produced without a beginning or end edge of an image field actually being present. In the example shown in FIG. 3 a BE signal is produced at each of the timing periods $I_{16}$, $I_{48}$, and $I_{70}$, and a BA signal at each of the timing periods $I_{45}$, $I_{69}$, and $I_{71}$ without these signals corresponding to the actual starting or end edge of the image field scanned. As can further be seen from FIG. 3, the signals BA and BE produced respectively on the appearance of the starting edge (timing period $I_1$) and end edge (timing period $I_{73}$) differ from the signals BA and BE formed by the timing period $I_{16}$, $I_{45}$, $I_{48}$, $I_{70}$ and $I_{71}$ as in the case of the timing period $I_1$ the signal B disappears and the signal B is formed simultaneously with the production of the signal BA and that in the case of the timing period $I_{73}$ the signal B disappears and the signal $\bar{B}$ is formed simultaneously with the production of the signal BE. In the case of the timing period $I_{16}$, $I_{45}$, $I_{48}$, $I_{70}$ and $I_{71}$ respectively the production of the signals BA and BE is not accompanied by transposition of the signals B and $\bar{B}$. It can in addition be seen from FIG. 3 that the BA and BE signals formed respectively in the case of the timing periods $I_{70}$ and $I_{71}$ differ from the BA and BE signals formed in the case of the timing periods $I_{16}$, $I_{45}$, and $I_{48}$ as in the case of the timing period $I_{70}$ the smoothed staircase signal Tr falls below the threshold $S_2$, so that signal C disappears, while in the case of the timing period $I_{71}$ the smoothed staircase signal Tr exceeds the threshold $S_2$, so that the signal C is formed again. On the formation of the signals BA and BE respectively with $I_{16}$, $I_{45}$ and $I_{48}$ the smoothed staircase signal Tr lies above the threshold value $S_2$. This difference is used as a criterion to establish whether a signal BA or BE was produced by a starting or end edge or in the interior of the image. BA or BE signals produced in the interior of the image are ignored in the further processing of the signals. In respect of differentiation between these two cases the applicable conditions are that a BA signal is taken into account only when, one timing pulse before its production, the signal C was not present, and that a BE signal is taken into account only when, one timing pulse before its formation, the signal C was present.

For the further processing of the signals indicated the following criteria are now stipulated:

A "very good starting edge" exists when a signal BA coincides with a change of the signal $\bar{B}$ to B. In this case, preferably one timing pulse after the formation of the respective BA signal, a "very good starting edge" signal $A_o$ in pulse form is formed. A signal of this kind is shown in the line marked $A_o$.

A "very good end edge" exists when a signal BE coincides with a change of the signal B to $\bar{B}$. In this case, preferably one timing pulse after the formation of the respective BE signal, a "very good end edge" signal $E_o$ in pulse form is formed. A signal of this kind is shown in the line marked $E_o$.

A "less good starting edge" exists for each signal BA taken into account in further processing. One timing pulse after a BA signal of this kind, a "less good starting edge" pulse signal A is produced. Two such signals are shown in the line marked A, E.

A "less good end edge" exists for each signal BE taken into account in further processing. One timing pulse after such a BE signal, a "less good end edge" pulse signal E is produced. Two such signals are shown in the line marked A,E.

The signals A and E are produced irrespective of whether a change-over is made from signal B to signal B or vice-versa. On the production of a signal $A_o$ or $E_o$, a signal A or E is therefore also produced in each case. The signals A and E may naturally also represent a beginning or end edge of an image when they are produced without the simultaneous production of the signals $A_o$ and $E_o$, namely in those cases where because of considerably underexposed edge portions of an image field there are actually no very good starting or end edges.

The signal shaper 18 contains two shift registers (not shown). The signals $A_o$ and A are each fed to a different one of these two shift registers whose outputs are connected to the following quality stage 19 and the signals $E_o$ and E are each fed direct to the quality stage 19. The $A_o$ and A signals are thereby retarded in relation to the $E_o$ and E signals in accordance with the number of shift register stages. The number of stages of each of the two shift registers is equal to the number of timing pulses of the timer 27 corresponding to the expected minimum image length of the film to be scanned (FIG. 1). The number of shift register stages is preferably selected to be equal to the number of timing pulses for a normal image length minus 4, which in the case of the scanning of a 35mm film (standard image length 36mm corresponding to 72 timing pulses, minimum image length to be expected 34 mm corresponding to 68 timing pulses) means 68 shift register stages. With each timing pulse the signals are advanced one stage in the shift register and after 68 timing pulses are therefore situated at the shift register outputs. With an ideal image field the $E_o$ or E signals follow 72 timing pulses behind the $A_o$ or A signals respectively. The $A_o$ and A signals delayed by 68 pulses in accordance with the 68 shift register stages are accordingly only 4 pulses ahead of the $E_o$ and E signals respectively. The retarded $A_o$ and A signals will hereinbelow be referred to as $A^*_o$ and $A^*$ respectively, and are shown in FIG. 3 on the line marked $A^*_o$, and $A^*$. The retardation of the signals described above provides the advantage that the correlation of the signals $A^*_o$ or $A^*$ and $E_o$ or E respectively requires only intervals of a few timing pulses. The pulses $A^*_o$, $A^*$, $E_o$ and E are transmitted to the quality stage 19 through the lines indicated by the same letters.

QUALITY STAGE

In the quality stage the possible marking positions are determined from the signals $A^*_o$, $A^*$, $E_o$ and E. The signals arriving there are subjected to selection and examined in respect of their mutual spacing, that is to say it is determined whether in each case a pair of signals $A^*_o$ and $E_o$, $A^*$ and E etc., designating a starting edge and an end edge, arrive in each case within a range determined by a given number of timing pulses.

For the purpose of simplification the example already selected in the preceding section of a standard image length of 36 mm corresponding to 72 timing pulses and the $A^*_o$ and $A^*$ signals being retarded by 68 pulses, will be retained in the following remarks. In these circumstances, with an image field coinciding with the standard image field, the signal $E_o$ lies four timing pulses behind the signal $A^*_o$. Since the deviation of the actual image field lengths from the standard length does not usually exceed $\pm$ 2 mm, depending on the camera, the range within which the starting and end edges of a pair of signals marking a good image field must lie is preferably fixed at eight timing pulses at the input of the quality stage 19.

In the quality stage pulse signals $Q_1$ and $Q_2$ are produced in accordance with the following criteria:

The signals $Q_1$ and $Q_2$ are produced simultaneously when both a signal $A^*_o$ and a signal $E_o$ occur at the input of the quality stage 11 within the range of eight timing pulses.

A $Q_1$ signal is produced when within the range of eight timing pulses there occurs at the inputs of the quality stage 11 a signal sequence which a) contains both $A^*_o$ and/or $A^*$ signals and an $E_o$ and/or E signal, and b) of the signals $A^*_o$ (if present) and $E_o$ (if present) contains either only the former or only the latter, and in which c) the first $A^*$ signal (if present) lies before the first E signal. All of these three conditiona *a, b, c* must be fulfilled.

A $Q_2$ signal is produced when within the range of eight timing pulses there occurs at the inputs of the quality stage 11 a signal sequence which contains only $A^*_o$ and/or $A^*$ signals or only $E_o$ and/or E signals.

The signal sequences used to form the $Q_1$ and $Q_2$ signals are also previously subjected to selection as follows: if in a signal sequence fulfilling the conditions for the formation of a $Q_1$ signal or a $Q_2$ signal a signal $A^*$ occurs twice within eight timing pulses, the first $A^*$ signal is suppressed. This step is based on the assumption that the first $A^*$ signal represents unimportant information, for example an outward bulging of the starting edge (typical fault). Of three $A^*$ signals occurring within eight timing pulses only the second is taken into account; the first and last $A^*$ signals are suppressed. If an E signal occurs twice within eight timing pulses, only the first is taken into account. In addition, those $A^*$ or $A^*_o$ signals which follow an E or $E_o$ signal within 8 timing pulses are also suppressed. Finally, on the occurrence of $A^*_o$ signals within eight timing pulses all $A^*$ signals, and on the occurrence of $E_o$ signals within 8 timing pulses all E signals are suppressed in the further processing of the signals.

Figure 4:
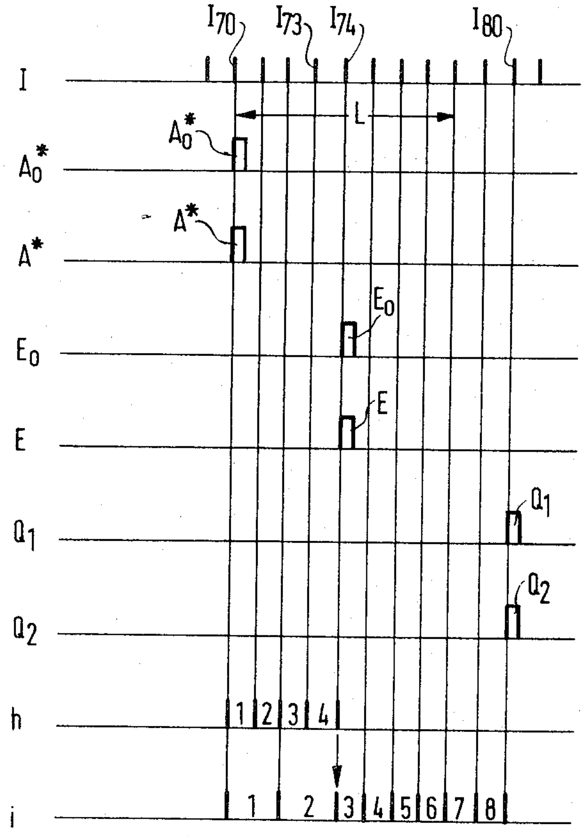

The pulse signals $Q_1$ and $Q_2$ which are obtained from the signals $A^*$, $A^*_o$ , E, and $E_o$ on the basis of the stipulated conditions constitute possible marking pulses. Since the marking must be made in the same position in each image field, it is necessary to choose a reference point for the marking. This reference point could in principle be determined either by the point in time when the $A^*$ and/or $A^*_o$ signal occurs or by the point in time when the E and/or $E_o$ signal occurs. It has however been found advantageous to use both the $A^*$ and/or $A^*_o$ signals and the E and/or $E_o$ signals for fixing the reference point, and to fix as marking reference point a point lying exactly in the middle between the $A^*$ and/or $A^*_o$ signal and the E and/or $E_o$ signal. This point corresponds to the centre of the image field which can therefore be determined by halving the distance between the $A^*$ and/or $A^*_o$ signal and the E and/or $E_o$ signal. For this purpose, on the occurrence of the $A^*$ or $A^*_o$ signal the counting of the interval, which in the present example extends over eight timing pulses, is started; in accordance with the remarks made in the section "Signal Shaper," the signal E or $E_o$ of the image field must occur within this interval. At the same time the timing pulses that lie between the signals $A^*$ and $A^*_o$ and E or $E_o$ are counted. The number of these timing pulses is halved. The moments in time when the signals $Q_1$ and/or $Q_2$ are formed are now fixed for the various image fields in such a manner that these signals coincide with respect to time with the longitudinal centres — obtained by the operation described — of the individual image fields, or at a predetermined distance in time, measured in timing pulses, therefrom. The pulse diagram in FIG. 4 shows the formation of the signals $Q_1$ and $Q_2$ from signals $A^*$, $A^*_o$, E and $E_o$ for the example of FIG. 3. Some of the signals appearing in FIG. 3 are missing in FIG. 4. The signal A occurring on the timing pulse $I_{72}$ in FIG. 3 was moved into the interval associated with the next following image field, in accordance with the remarks made in the section "Signal Shaper." The signal E, which likewise occurs in FIG. 3 on the timing pulse $I_{72}$, was suppressed in accordance with the remarks made above in this section. The signals $A^*_o$, $A^*$, $E_o$ and E in FIG. 3 which are retained are shown on the lines marked $A^*_o$, $A^*$, $E_o$, and E in FIG. 4. The signal $A^*_o$ occurring on the timing pulse $I_{70}$ triggers the counting of the interval L extending in the present example over 8 timing pulses. The signal $A^*$ occurring on the same timing pulse $I_{70}$ is not taken into account in the further processing of the signals, in accordance with the remarks made above in this section. The signal $E_o$ occurring on the timing pulse $I_{74}$ stops the counting of the interval L. The signal E occurring on the same timing pulse $I_{74}$ is not used for the further processing of the signal, in accordance with the remarks made above in this section. In the present case the conditions stipulated in this section for the simultaneous occurrence of the $Q_1$ and $Q_2$ signals are fulfilled. The position of the $Q_1$ and $Q_2$ signals in respect of time is now determined by halving the number of pulses counted and adding a predetermined number of pulses to this result. The number of additional pulses is required to ensure that the $Q_1$ and $Q_2$ signals lie outside the interval L. In the present example the number of pulses added is eight.

For the purpose of counting the interval L and determining the position of the $Q_1$ and $Q_2$ signals, and hence for determining the centre axis, two counters connected together are used. The first of these two counters runs at the normal timing frequency and the second runs selectively at normal or half timing frequency. Both counters can count to a maximum of eight. On occurrence of the timing pulse $I_{70}$ (signal $A^*_o$) both counters begin to count, the first at normal timing frequency — shown on line *h* in FIG. 4 — and the second at half the timing frequency - line *i*. At the timing period $I_{73}$ the first counter has reached a count of four, and the second a count of two. On the occurrence of the signal $E_o$ (timing period $I_{74}$) the first counter is stopped and the second counter is switched over to normal timing frequency. The second counter continues to count to eight, and on reaching that count (timing pulse $I_{80}$) releases the two signals $Q_1$ and $Q_2$. The distance between the point in time at which the signals $Q_1$ and $Q_2$ are released and the centre longitudinal axis of the image field (timing pulse $I_{72}$) amounts to eight timing pulses, and is therefore always equal to the length of the interval L. When within an interval of eight timing pulses either only the signals $A^*_o$ or $A^*$ or only the signals $E_o$ or E occur, the first counter runs to its maximum count of eight, and on reaching that count produces only one signal $Q_2$.

With the signals $Q_1$ and $Q_2$ obtained in the quality stage 19, which designate possible marking points, a transverse comparison over a plurality of image fields, preferably three, is then made in order to obtain actual marking points. In order to make it unnecessary, for the purposes of the transverse comparison, for the signals corresponding to the individual image fields to be stored over a plurality of image field lengths, the $Q_1$ and $Q_2$ signals of each three successive image fields are grouped in the following "signal grouping stage."

SIGNAL GROUPING STAGE

The signal grouping stage given the general reference 20 comprises two pairs of shift registers 20*a*, 20*aa* and 20*b*, 20*bb*, which are connected in series. Each of these four shift registers has the same number of stages to correspond with the number of timing pulses used in scanning a normal length of an image field. For the scanning of 35 mm. films with a standard image field length of 36 mm., corresponding to 72 timing pulses, the number of stages is preferably selected to be equal to 67. All four shift registers are pulsed through the line 28 by the timer 27 (FIG. 1). The input of the shift register 20*a* is connected to the $Q_1$ signal output of the quality stage 19. On scanning three successive image fields U,V, and W, the signals $Q_{1U}$ and $Q_{2U}$ first pass to the inputs of the shift registers 20*a* and 20*b* respectively. In the case of a 35 mm. film with an image field length of 36 mm. and with spaces with a width of 2 mm. between the individual image fields, the signals $Q_{1V}$ and $Q_{2V}$ pass after 76 timing pulses, and the signals $Q_{1W}$ and $Q_{2W}$ pass after 76 more timing pulses to the inputs of the shift registers 20*a* and 20*b* respectively. The signals $Q_{1U}$ and $Q_{2U}$ appear at the outputs of the shift registers 20*a* and 20*b* respectively 67 timing pulses after they are fed-in, and at the outputs of the shift registers 20*a* and 20*b* respectively 134 timing pulses after being fed-in. The shift register circuit 20 thus effects a grouping of the signals in respect of time. The Q signals displaced in respect of time at the outputs of the four shift registers 20*a*, 20*aa*, 20*b*, and 20*bb* respectively are designated $Q_1^*$, $Q_1^{**}$, $Q_2^*$ and $Q_2^{}$ respectively in accordance with their displacements in respect of time. The signal $Q_1^{}$ or $Q_2^{**}$ always exists first; after a few timing pulses, in the ideal case after nine timing pulses, the signal $Q_1^*$ or $Q_2^*$ appears, and after a few more timing pulses, in the ideal case after nine timing pulses, the signal $Q_1$ or $Q_2$ appears. The time sequence of the signals is always $Q^{**}$, $Q^*$, Q. All signals produced in this way are fed through lines $Q_1^{**}$, $Q_1^*$, $Q_1$ and $Q_2^{**}$, $Q_2^*$, $Q_2$ respectively, which carry the same references, to the transverse comparison stage 21.

Figure 5:
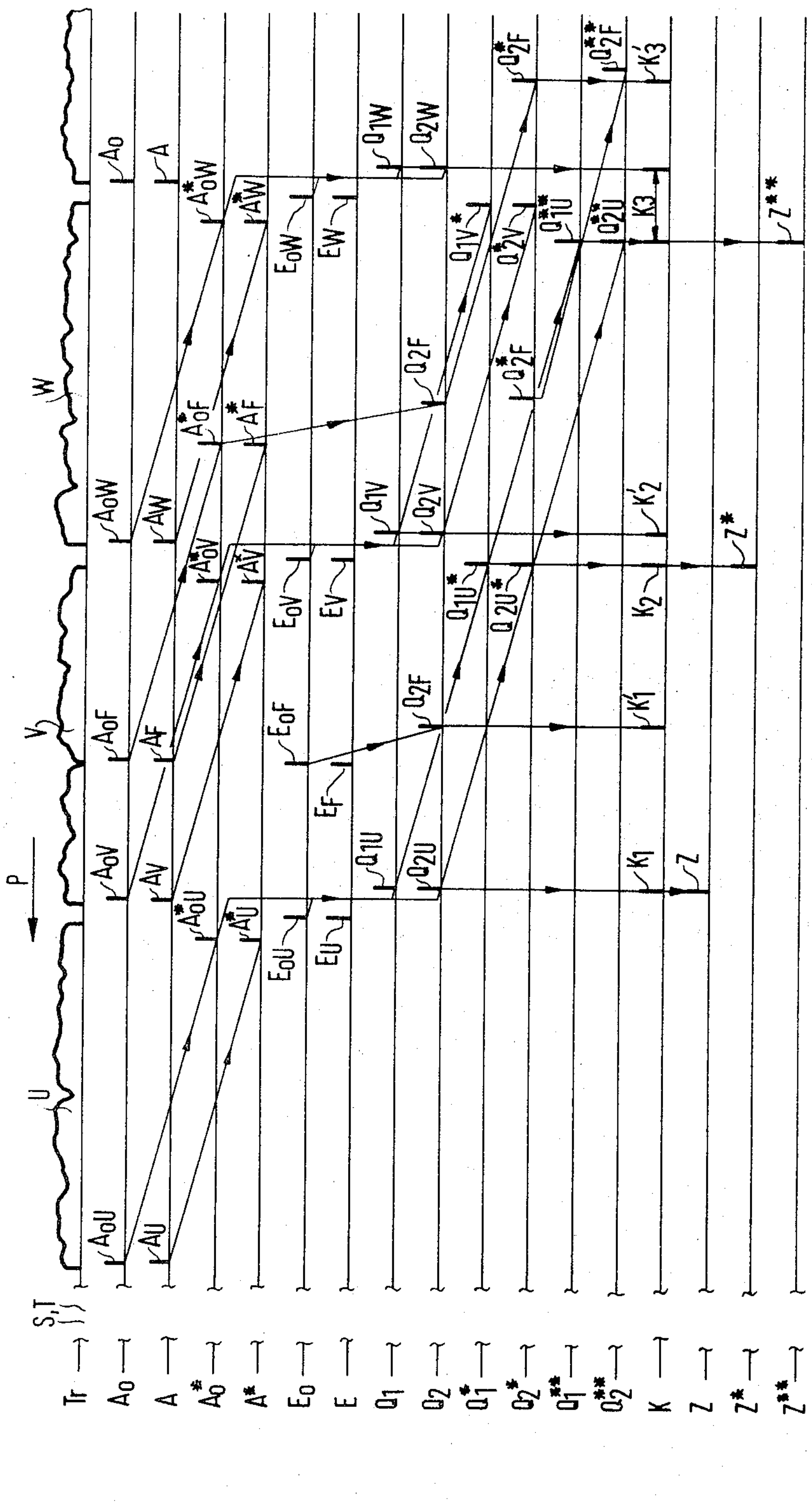

In FIG. 5 the time grouping of the signals $Q_1$ and $Q_2$ produced on the scanning of three successive image fields U, V, and W is illustrated diagrammatically. Line Tr shows three successive image fields with very good starting and end edges at the actual image starts and ends respectively. The image field V has in addition in the interior of the image field a very good starting and a very good end edge. In the direction of transport of the film, which is indicated by an arrow P, there is situated upstream of the image field U an unexposed part which extends over two normal image field lengths S and T and a normal space width and on the scanning of which no signals are obtained. Upstream of the unexposed part there may once again be an image field, but the unexposed part may also constitute the beginning of a film. The lines $A_o$ to E show the signals $A_{oU}$, $A_U$, $A_{oU}^*$, $A_U^*$, $E_{oU}$ and $E_u$ (image field U), $A_{oV}$, $A_V$, $A_{oV}^*$, $A_V^*$, $E_{oV}$ and $E_V$ (image field V, signals produced by the actual starting or end edge), $A_{oF}$, $A_F$, $A_{oF}^*$, $A_F^*$, $E_{oF}$ and $E_F$ (image field V, signals produced by the end edge in the interior of the image field), and $A_{oW}$, $A_W$, $A_{oW}^*$, $A_W^*$, $E_{oW}$ and $E_W$ (image field W), produced in the signal shaper 18. The lines $Q_1$ and $Q_2$ show the signals $Q_{1U}$, $Q_{2U}$, $Q_{2F}$, $Q_{1V}$, $Q_{2V}$, $Q_{1W}$, and $Q_{2W}$ obtained in the quality stage 19. The lines $Q_1^*$ to $Q_2^{**}$ show the signals $Q_{1U}^*$, $Q_{2U}^*$, $Q_{2F}^*$, $Q_{1V}^*$, $Q_{2V}^*$, $Q_{1U}^{}$, $Q_{2U}^{}$, and $Q_{2F}^{}$ derived from the signal grouping stage 20. As can be seen from lines $Q_1$ to $Q_2^{}$, the $Q^{**}$signals of the image field U, the Q* signals of the image field V, and the Q signals of the image field W arrive within one interval, the length of which corresponds to one quarter of the standard image length (18 timing pulses), at the outputs of the signal grouping stage 20 and thus also at the inputs of the transverse comparison stage 21.

TRANSVERSE COMPARISON STAGE

In the transverse comparison stage 21 the regions where the signals $Q_1$, $Q_2$, $Q_1$*, $Q_2$*, $Q_1$, $Q_2$ occur grouped is first sought. As was established in the section "Signal Grouping Stage," the interval within which the group signals of three image fields must lie in the ideal case extends over 18 timing pulses. The length of this interval is substantially dependent on the width of the spaces separating the image fields. Since in almost all ordinary cameras the space between image fields or frames does not exceed 2 mm. and since it does not in any case exceed 4 mm., it may be assumed, taking into account all possible sources of error, that the signals $Q_1$, $Q_2$, $Q_1$*, $Q_2$*, $Q_1$, $Q_2$ must occur within an interval of 32 timing pulses. The counting of a group interval of this kind is initiated by the first Q signal in each particular case. If the image field scanned has no starting or end edges in the interior of the image, all the Q signals actually occur within the prescribed grouping intervals. If on the other hand the scanned image fields have starting or end edges in the interior of the image, some of the Q signals will usually not lie within the prescribed grouping intervals of 32 timing pulses. In this case it may occur that individual Q signals will initiate the counting of a grouping interval and that no further Q signals will occur in this interval. For this reason two successive intervals are always used for determining the actual grouping interval. For this purpose it is established that the maximum length of each of these two sub-intervals must not exceed the length fixed for the grouping interval (32 timing pulses) and that the distance between the start of the sub-interval which is first in respect of time and the end of the second sub-interval may at most be equal to twice the maximum grouping interval length (2 × 32 timing pulses) plus a few timing pulses, particularly two timing pulses (for signal evaluation). In addition it is preferably established that the beginning of each of the two sub-intervals should be initiated and terminated by a Q signal. From the last stipulation and from the statements made in this section regarding the time sequence of the signals Q**, Q*, and Q, namely that the Q** signals must always occur first, then the Q* signals and finally the Q signals, it follows that every Q signal marks the end of an interval. In addition, it is established that whenever the first signal is not a Q** signal but a Q* or Q signal, the sub-interval in question is terminated. Finally it is established that after termination of the second sub-interval within the maximum length of two sub-intervals (66 timing pulses from the beginning of the first sub-interval) no further signals will be taken into account. Predetermined weights are allocated to the Q signals, for example the weight 3 to each $Q_1$ signal ($Q_1$, $Q_1$*, $Q_1$**) and the weight 1 for each $Q_2$ signal. In every sub-interval the weights of all the Q signals occurring there are added. Of each pair of sub-intervals the one having the higher total weight will be considered to be the actual grouping interval. For the further processing of signals only the one having the higher weight in each pair of sub-intervals is taken into account; the other sub-intervals are eliminated. As the result of the laws for the formation of the Q signals and the signal grouping the sub-interval which is first in each pair will usually have the higher weight. For this reason it is further established that the second sub-interval will be evaluated as the actual grouping interval only when for two successive pairs of sub-intervals the second is in each case found to have the higher weight. If this case occurs the transposition of the two sub-intervals is subsequently effected by corresponding signal displacement in each pair of sub-intervals.

An example of the above described function of the transverse comparison stage 21 is illustrated in FIG. 5. The formation of the signals on lines Tr to $Q_2$** has already been explained in the section "Signal Grouping Stage." The actual grouping intervals are now determined as follows: the simultaneously occurring signals $Q_{1U}$ and $Q_{2U}$ initiate an interval $K_1$ (sub-interval) and simultaneously terminate it (within one timing period; interval length zero). In this interval $K_1$ only the signals $Q_{1U}$ and $Q_{2U}$ with the weights 3 and 1 respectively are contained. The total weight for the interval $K_1$ accordingly amounts to 3 + 1 = 4. The signal $Q_{2F}$ (error, see section "Signal Grouping Stage") initiates an interval $K_1'$ and terminates it simultaneously. The total weight for the interval $K_1'$ accordingly amounts to 1. The simultaneously occurring signals $Q_{1U}$* and $Q_{2U}$* initiate an interval $K_2$ and terminate it simultaneously. The total weight of the interval $K_2$ amounts to 3 + 1 = 4. The simultaneously occurring signals $Q_{1V}$ and $Q_{2V}$ initiate an interval $K_2'$ and terminate it simultaneously. The total weight of the interval $K_2'$ amounts to 3 + 1 =4. The signals $Q_{2F}$ and $Q_{2F}$* (error, see section "Signal Grouping Stage") are not taken into account, since they lie in a region which is at a distance of less than 66 timing pulses from the beginning of the $K_2$ interval, but in this region two intervals have already been initiated, namely the two intervals $K_2$ and $K_2'$. The signals $Q_{1U}$ and $Q_{2U}$, which occur simultaneously with one another, initiate an interval $K_3$ which is terminated by the signals $Q_{1W}$ and $Q_{2W}$, which also occur simultaneously with one another. The total weight for the interval $K_3$ amounts to 1+3+1+3+1+3=12. The signal $Q_{2F}$* (error) initiates an interval $K_3'$ and terminates it simultaneously. The total weight of the interval $K_3'$ amounts to 1. The signal $Q_{2F}$ (error) is not taken into account because it lies in a region which is at a distance of less than 66 timing pulses from the beginning of the $K_3$ interval and in that region two intervals, namely $K_3$ and $K_3'$, have already been initiated. For the K intervals (sub-intervals) of the example of FIG. 5** the following total weights are thus applicable: for $K_1$ the total weight is equal to four, for $K_1'$ it is equal to one, for $K_2$ it is equal to four, for $K_2'$ it is equal to four, for $K_3$ it is equal to 12, and for $K_3'$ it is equal to one. Accordingly for this example and for the signal sections considered only the grouping intervals $K_1$, $K_2$, $K_3$ will be taken into account in the further processing of the signals; the other three intervals $K_1'$, $K_2'$, and $K_3'$ are eliminated.

After selection of the K intervals interrogation follows for the image field (U) in each group of three image fields which, in the film transport direction indicated by an arrow P in FIG. 5, lies furthest forwards, to determine whether a signal $Q_{1U}$ or $Q_{2U}$ allocated to this image field is present within the K interval having the higher total weight. If this is the case, a signal Z is produced at the output of the transverse comparison stage 21. All other Q and/or Q signals in the K interval considered are not taken into account. If neither a $Q_{1U}$ nor $Q_{2U}$ signal is found in the K interval in question, then an examination is made to determine if a signal associated with the next following image field (V), that is to say a $Q_{1V}$* and/or $Q_{2V}$* signals is present there. If this is the case, a signal Z* is produced at the output of the transverse comparison stage 21. The remaining Q signals within the K interval in question are then no longer taken into account. If none of the signals $Q_{1U}$, $Q_{2U}$ , $Q_{1V}$* or $Q_{2V}$* is found in the K interval in question, then an examination is made to determine if a signal associated with the third image field of this group, that is to say a signal $Q_{1W}$ and/or $Q_{2W}$, is present there. If this is the case, a signal Z is produced at the output of the transverse comparison stage 21. All three of these cases can be seen in FIG. 5: for the image field (U) lying furthest forwards in the direction of the arrow Pa signal Z is produced. For the middle image field (V) and the image field (W) lying furthest to the rear there is likewise produced in each case a signal Z (not illustrated), since the signals $Q_{1V}$, $Q_{2V}$ and $Q_{1W}$, $Q_{2W}$ produced on the scanning of these image fields are converted respectively into signals $Q_{1V}$, $Q_{2V}$, and $Q_{1W}$, $Q_{2W}$ when processed in the signal grouping stage 20. On the scanning of the two empty parts S and T (unexposed part of film) no signals are obtained, and consequently for the empty part T there is produced a signal Z* obtained from the signals $Q_{1U}$* and $Q_{2U}$* and for the empty part S a signal Z obtained from the signals $Q_{1U}$ and $Q_{2U}$. The signals Z, Z*, and Z are shown in the lines thus designated. On each transverse comparison over three image fields there is thus formed only one of the three signals Z or Z* or Z. This one signal Z or Z* or Z is evaluated as a possible marking signal for the image field furthest forwards in the direction of the arrow P. Each signal Z is evaluated as the actual marking signal for the image field lying furthest forwards, since it was formed from the Q** signals obtained on the scanning of this image field. If a signal Z* is formed, the position of the marking signal for the image field furthest forwards must be extrapolated from this signal, which was formed from the signals obtained by the scanning of the next following image field. Finally, if a signal Z is formed, the position of the marking signal for the image field furthest forwards must be extrapolated from the signal, over two image field lengths. These extrapolations are effected in the extrapolation stage 22, to which the signals Z**, Z*, and Z are transmitted through lines designated by the same letters.

EXTRAPOLATION

As explained in the preceding section "Transverse Comparison Stage," a signal Z** or a signal Z* or a signal Z is produced by this stage for each image field scanned and fed to the extrapolation stage 22. In the extrapolation stage each of these signals constituting an actual marking position is brought into the relative position necessary for marking the corresponding image field. The distance between the measuring cells 7 and the marking device 15 (FIG. 1) is so selected that it is not less than a predetermined minimum length, which in the present example amounts to about four image field lengths plus four space lengths. It is thereby ensured that each marking signal will always be present at the input of the extrapolation stage before the arrival of the appertaining image field at the marking device. Synchronisation between the marking signal and the appertaining image field thus amounts to a retardation of the marking signals. For this purpose the marking signals are fed into a shift register (not shown) and shifted through the latter at the frequency of the timing pulses. The number of shift register stages corresponds to the distance, in timing pulses, between the point on the image field where marking is intended and the marking device at the moment when the appertaining marking signal is fed into the shift register. As soon as the marking signal has reached the output of the shift register, a pulse M is produced and transmitted from the extrapolation stage to the stepping motor and punch control 23.

When the signal received in the extrapolation stage is a Z** signal, the latter is fed into the first stage of the shift register. If on the other hand the signal is a Z* signal, that is to say a marking signal which was obtained for the image field in question from the next following image field, or a Z signal which was obtained from the image field following next but one in respect of time, extrapolation must be effected from this Z* or Z signal to the image field in question. This extrapolation is preferably effected, in the example considered (35 mm. film with a standard image length of 36 mm. and a standard space width of 2mm.), by each Z* signal received in the extraplation stage being transferred forwards by 38 mm. and each Z signal transferred forwards by 76 mm. This transfer of signals is effected by feeding-in the Z* or Z signals by way of corresponding shift register stages. Z** signals are fed into the first shift register stage, Z* signals into the ninth stage, and Z signals into the eighteenth stage. The nine or 18 shift register stages which effect displacements of the signals by nine and 18 pulses respectively are used since the Q signals belonging to two neighbouring image fields are spaced apart in the present example by nine pulses. As soon as as long as no Z'','' Z*, or Z signal is received by the extrapolation stage during 76 timing pulses, although the scanned film is not yet finished, the extrapolation stage will automatically produce one marking pulse M for every 76 timing pulses.

STEPPING MOTOR AND PUNCH CONTROL

The stepping motor and punch control 23 (FIG. 2) on the one hand controls the stepping motor 9 (FIG. 1) in synchronism with the timing pulses, and on the other hand transmits all marking pulses M through the line 16 to the marking device 15, as already described above in connection with FIG. 1.

SPLICE DETECTOR

The splice detector 24 (FIG. 2) receives signals from the photoelectric cell 29 which continuously scans the film. As soon as the infrared light source 31 (FIG. 1) detects a splice, the infrared radiation emitted is diffused more intensely than in regions where there is no splice, and the output signal of the photoelectric measuring cell 29 declines abruptly. At the end of the splice this output signal increases again abruptly. This abrupt increase of the output signal initiates a signal which for a predetermined interval puts the stages 17 to 23 out of operation by means of the lines 30, so that no signals can be recorded or produced in those stages.

I claim:

1. A method of detecting image fields on a strip of film comprising, a. scanning the strip in a direction along its length with a beam of radiation to provide indications of the densities of all of a plurality of separate adjacent areas across the strip b. electronically processing the density indications to produce upon detecting a predetermined change indensity in a predetermined number of said areas a first signal indicating the beginning and a second signal indicating the end of an image field c. allocating one binary value to all those density indications which exceed a first predetermined threshold value and the other binary value to all those density indications which do not exceed said first predetermined threshold value, the first and second signal being produced upon the presence of a predetermined number of said one binary values simultaneously and d. including utilising the signals obtained by scanning at least two standard image field lengths plus standard space widths to determine the acutal image positions.

2. A method according to claim 1, including producing an "image" signal when at least one of the indications coded with the binary one value occurs and producing a "no image" signal when no indication exceeds said first predetermined threshold.

3. A method according to claim 2, including preferring all those first signals which coincide with respect to time with signal changes from "no image" to "image" signals and preferring all those second signals which coincide in respect to time with signal changes from "image" to "no image" signals.

4. A method according to claim 3, including suppressing the first of two neighbouring of said first signals when the time between the occurrence of those two neighbouring signals is less than the time taken to scan one quarter of a predetermined standard image field and suppressing the second of two neighbouring of said second signals when the time between the occurrence of those two neighbouring signals is less than the time taken to scan one quarter of a predetermined standard image field.

5. A method according to claim 3, including suppressing the first and last of three neighbouring of said first signals when the time of occurrence between the first and last of the three neighbouring signals is less than the time taken to scan one quarter of a predetermined standard image field and suppressing the second and third of three neighbouring of said second signals when the time of occurrence between the first and last of the three neighbouring signals is less than the time taken to scan one quarter of a predetermined standard image field.

6. A method according to claim 3, including suppressing the first of two neighbouring of said first signals when the time between the occurrence of those two neighbouring signals is less than the time taken to scan one quarter of a predetermined image field and suppressing the second of two neighbouring of said second signals when the time between the occurrence of those two neighbouring signals is less than the time taken to scan one quarter of said standard image field, the suppression of said first and second signals taking place only when the time of occurrence between adjacent signals is at most equal to twice the time of scanning the spaces between image fields.

7. A method according to claim 3, including suppressing the first and last of three neighbouring of said first signals when the time of occurrence between the first and last of the three neighbouring signals is less than the time taken to scan one quarter of a predetermined standard image field, and suppressing the second and third of three neighbouring of said second signals when the time of occurrence between the first and last of the three neighbouring signals is less than the time taken to scan one quarter of said standard image field, the suppression of said first and second signals taking place only when the time of occurrence between adjacent signals is at most equal to twice the time of scanning the spaces between image fields.

8. A method according to claim 6, wherein within a time interval which is at most equal to twice the time of scanning the space between image fields both preferred and non-preferred first signals occur, the non-preferred first signals are suppressed in the further processing of the signals and wherein within a time interval which is at most equal to twice the time of scanning the space between image fields both preferred and non-preferred second signals occur, the non-preferred second signals are suppressed in the further processing of the signals.

9. A method according to claim 7, wherein within a time interval which is equal to twice the time of scanning the space between image fields both preferred and non-preferred first signals occur, the non-preferred first signals are suppressed in the further processing of the signals and wherein within a time interval which is equal to twice the time of scanning the space between image fields both preferred and non-preferred second signals occur, the non-preferred second signals are suppressed in the further processing of the signals.

10. A method according to claim 3, including a. evaluating each of two successive preferred first and second signals as the most probable image start and most probable image end when the time between their occurrence is not greater than the time taken to scan a predetermined standard image field plus the standard space between fields and not smaller than the time taken to scan the standard image field minus the standard space;

b. if the condition stipulated under a) is not fulfilled, evaluating a succession of a preferred first signal and a non-preferred second signal as the most probable image start and most probable image end when the time between their occurrence is not greater than indicated in a);

c. if none of the conditions stipulated under a) and b) are fulfilled, evaluating a succession of a non-preferred first signal and a preferred second signal as the most probable image start and most probable image end when the time between their occurrence is not greater than indicated in point a);

d. if none of the conditions stipulated in a) to c) are fulfilled, evaluating a succession of a non-preferred first signal and a non-preferred second signal as the most probable image start and most probable image end when the time between their occurrence is not greater than indicated in point a);

e. if none of the conditions stipulated in a) to d) are fulfilled, evaluating a preferred first signal as the most probable image start;

f. if none of the conditions stipulated in a) to e) are fulfilled, evaluating a preferred second signal as the most probable image end;

g. if none of the conditions stipulated in a) to f) are fulfilled, evaluating a non-preferred first signal as the most probable image start; and h. if none of the conditions stipulated in a) to g) are fulfilled, evaluating a non-preferred second signal as the most probable image end.

11. A method according to claim 10, wherein for each of the conditions stipulated in a) to h), in the event of their fulfillment, a possible image position pulse Q is produced and a determined weight is assigned to each of these position pulses, the highest weight is assigned to the Q signals produced by fulfillment of condition a) and lower weights, declining in status from b) to h), are assigned to the Q signals produced by fulfillment of the conditions b) to h), and that the image positions are determined by taking this weight into account.

12. A method according to claim 11, wherein a position signal $Q_1$ with a high weight is assigned to each fulfillment of one of the conditions b) to d) and a position signal $Q_2$ with a lower weight is assigned to each fulfillment of one of the conditions e) to h), these two weights being so selected that the higher is more than twice as great as the lower, and that the simultaneous occurrence of a $Q_1$ signal and a $Q_2$ signal is allocated to each fulfillment of the condition a), so that for the fulfillment of the condition a) the highest weight is obtained.

13. A method according to claim 12, wherein only Q signals are used and these are grouped in respect of time in such a manner that the Q signals belonging to successive image fields come to lie within an interval, referred to hereinbelow as grouping interval, which is shorter than half the standard image field length.

14. A method according to claim 13, wherein the length of each grouping interval is fixed so as to amount to about two $(n-1)$ times the standard space width.

15. A method according to claim 13, wherein the grouping of the Q signals is effected so that in each grouping interval the Q signals occur in the same sequence as the images from which they originate from one another in the film.

16. A method according to claim 13, wherein within intervals which are shorter than the standard image field length at least two sub-intervals $K_1$, $K_1$ etc., are determined by the occurrence of Q signals, one such sub-interval always being initiated on the occurrence of a Q signal originating from the first image field of the region considered and one such sub-interval always being terminated on the occurrence of a Q signal originating from the last image field of the same region, while on the occurrence of Q signals originating from image fields lying therebetween one such sub-interval is always initiated and is terminated simultaneously on during one timing period, that in the sub-intervals so determined the weight of all the Q signals ($Q_1$, $Q_2$) occurring there, including the initiating and terminating signals, are added together, and that for the purpose of determining the image positions only the sub-interval with the highest total weight, which constitutes a preferred grouping interval, is utilised in each case.

17. A method according to claim 16, wherein in each of the aforesaid intervals only two sub-intervals are allowed, so that in the case of Q signals which occur after the end of the second sub-interval no further sub-intervals are initiated.

18. A method according to claim 16, in which out of each of the preferred grouping intervals only those Q signals ($Q_1$, $Q_2$) are used as actual marking signals which originate from the image field lying furthest forwards in the region in question, and that in the event of no such Q signal existing only the Q signals originating from the following image field are taken into account, and so on.

19. A method according to claim 18, in which the marking signals selected from the preferred grouping intervals are so connected that each of these signals marks an image field which lies n image fields upstream of the grouping interval from which the respective marking signal was selected.

20. Apparatus for detecting image fields on a strip of film comprising, means for scanning the strip in a direction along its length with a beam of radiation to provide indications of the densities of all of a plurality of separate adjacent areas across the strip, means for electronically processing the density indications to produce upon detecting a predetermined change in density in a predetermined number of said areas a first signal indicating the beginning and a second signal indicating the end of an image field and means for utilising the signals obtained by scanning at least two standard image field lengths plus standard space widths to determine the actual image positions, said scanning means including a plurality of photosensitive cells and a light source projecting light through said film onto said cells, said cells being arranged in a direction transverse to the direction of movement of said strip and said electronic processing means including means allocating one binary value to all those density indications which exceed a first predetermined threshold value and the other binary value to all those density indications which do not exceed said first predetermined threshold value, the first and second signal being produced upon the presence of a predetermined number of said one binary values simultaneously.

21. Apparatus according to claim 20, in which said electronic processing means further includes means producing an "image" signal when at least one of the indications coded with the binary one value occurs means producing a "no image" signal when no indication exceeds said first predetermined threshold means selecting all those first signals which coincide with respect to time with signal changes from "no image" to "image" signals and means selecting all those second signals which coincide in respect to time with signal changes from "image" to "no image"

22. Apparatus for detecting image fields on a strip of film each field being of substantially the same size and being spaced one from another along said strip by a substantially constant amount, the apparatus comprising, means advancing said film step by step in equal increments of length, a light source positioned to illuminate said film, a plurality of photocells arranged in a line across said film substantially transverse to the direction of advancement of the film, to receive light from said source after the light has passed through the film, an electronic processing unit coupled to said cells and responsive to electrical outputs therefrom representing the intensity of the light falling on said cells and thus representing the density of the areas of said film through which said light passes to said cells, to indicate the beginning or end of each image area said electronic processing unit comprising means producing a first signal when a predetermined number of said cells produce simultaneously an electrical output of a value greater than a first threshold value, means differentiating said first signal to produce a second signal, means generating a third signal when the value of said second signal exceeds a second threshold value and a fourth signal when the value of said second signal exceeds a third threshold value, said third and fourth signals each indicating respectively the beginning and end of an image field, means producing a fifth signal indicating that at least one of said cells produces an electrical output of a value greater than the first threshold value, means producing a sixth signal indicating that none of the cells produces an electrical output of a value greater than the first threshold value, and means for selecting a third signal which is produced during a predetermined time interval in which a fifth signal is produced to indicate the beginning of an image field and for selecting a fourth signal which is produced during a predetermined time interval in which a sixth signal is produced to indicate the end of an image field.

* * * * *